US011260922B2

(12) United States Patent
Ishikawa et al.

(10) Patent No.: US 11,260,922 B2
(45) Date of Patent: Mar. 1, 2022

(54) WORK VEHICLE

(71) Applicant: KUBOTA CORPORATION, Osaka (JP)

(72) Inventors: Junichi Ishikawa, Osaka (JP); Minoru Hiraoka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 21 days.

(21) Appl. No.: 16/496,151

(22) PCT Filed: Mar. 28, 2018

(86) PCT No.: PCT/JP2018/012710
§ 371 (c)(1),
(2) Date: Sep. 20, 2019

(87) PCT Pub. No.: WO2018/181460
PCT Pub. Date: Oct. 4, 2018

(65) Prior Publication Data
US 2020/0062324 A1    Feb. 27, 2020

(30) Foreign Application Priority Data

Mar. 29, 2017  (JP) .............................. JP2017-066386
Mar. 29, 2017  (JP) .............................. JP2017-066387
Mar. 29, 2017  (JP) .............................. JP2017-066388

(51) Int. Cl.
*B62D 61/12*         (2006.01)
*B62D 61/10*         (2006.01)

(52) U.S. Cl.
CPC ............. *B62D 61/12* (2013.01); *B62D 61/10* (2013.01)

(58) Field of Classification Search
CPC ................................ B62D 61/10; B62D 61/12
See application file for complete search history.

(56) References Cited

U.S. PATENT DOCUMENTS 3,481,418 A * 12/1969 Wallan .................. B62D 61/12
                                                          180/23
3,642,085 A *  2/1972 Bird ...................... B62D 61/12
                                                          180/41

(Continued)

FOREIGN PATENT DOCUMENTS

JP        61-500604        4/1986
JP        09-142347        6/1997

(Continued)

OTHER PUBLICATIONS

Official Communication issued in International Application No. PCT/JP2018/012710, dated Jun. 19, 2018.

(Continued)

*Primary Examiner* — Barry Gooden, Jr.
(74) *Attorney, Agent, or Firm* — Greenblum & Bernstein, P.L.C.

(57) ABSTRACT

A work vehicle includes a vehicle body, a plurality of traveling devices for driving traveling, a plurality of bending link mechanisms supporting the plurality of traveling devices to the vehicle body with allowing the plurality of traveling devices to be elevated/lowered independently of each other, a driving mechanism capable of changing respective postures of the plurality of bending link mechanisms independently of each other, and an idle wheel freely rotatably supported to an intermediate bending portion of each one of the plurality of bending mechanisms.

16 Claims, 10 Drawing Sheets

(56) References Cited

U.S. PATENT DOCUMENTS

| | | | | |
|---|---|---|---|---|
| 4,395,191 A | * | 7/1983 | Kaiser | E02F 9/085 |
| | | | | 180/7.1 |
| 4,558,758 A | | 12/1985 | Littman et al. | |
| 4,932,491 A | * | 6/1990 | Collins, Jr. | B62D 49/08 |
| | | | | 180/22 |
| 2019/0389268 A1 | * | 12/2019 | Ishikawa | B60K 7/0015 |
| 2020/0017152 A1 | * | 1/2020 | Ishikawa | B62D 61/12 |
| 2020/0354003 A1 | * | 11/2020 | Ishikawa | B62D 61/10 |

FOREIGN PATENT DOCUMENTS

| | | |
|---|---|---|
| JP | 2007-290054 | 11/2007 |
| JP | 2009-096335 | 5/2009 |
| WO | 8502361 | 6/1985 |

OTHER PUBLICATIONS

Chinese Office Action in counterpart application No. CN201880023027. 9, dated Jul. 29, 2021.

* cited by examiner

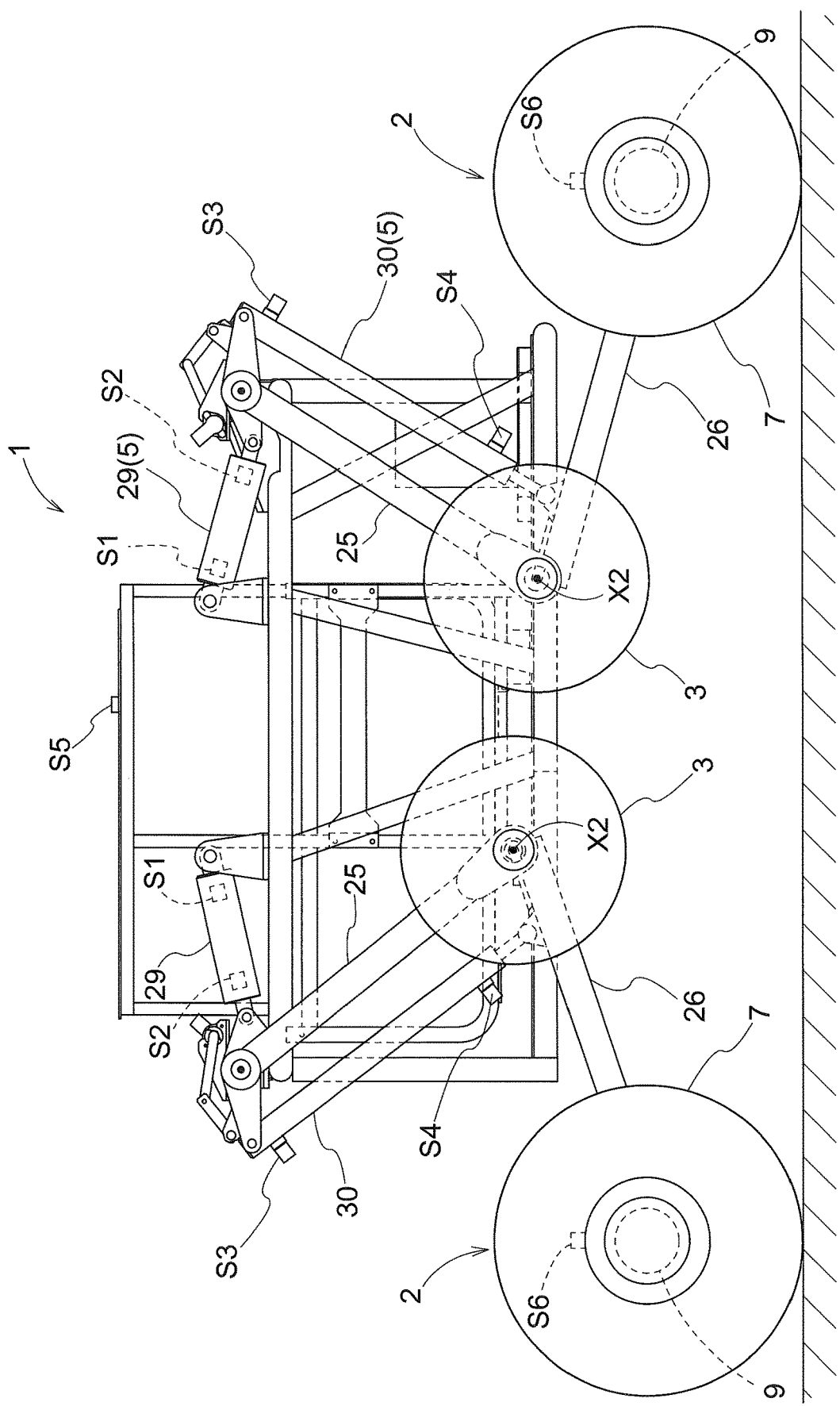

WORK VEHICLE

TECHNICAL FIELD

The present invention relates to a work vehicle suitable for traveling on a road surface having much unevenness.

BACKGROUND ART

[1] Among conventional work vehicles, there is a work vehicle configured such that each one of a plurality of traveling wheels mounted at four corners of a vehicle body is supported via a bending link mechanism having two joints to be flexibly operable, and the link mechanism is configured to be driven to be flexed by a driving force of an electric motor incorporated within the link mechanism (see e.g. JP H09-142347A (Patent Literature 1)).

[2] In JP H09-142347A, a plurality of wheels are mounted on the vehicle body and of the plurality of wheels, the wheels located on the left and right on the front/rear opposed sides of the vehicle body are supported to the vehicle body via the bending link mechanism having two joints to be flexibly operable, and the wheels located at the front/rear center are supported to the vehicle body under position-fixed state.

[3] In JP H09-142347A, each one of the plurality of traveling wheels mounted at four corners of the vehicle body is supported via the bending link mechanism having two joints to be flexibly operable, and the link mechanism is configured to be driven to be flexed by a driving force of an electric motor incorporated within the bending link mechanism

PRIOR ART DOCUMENT

Patent Literature

Patent Literature 1: Japanese Unexamined (Laid-Open) Patent Application H09-142347 (JP H09-142347A)

SUMMARY OF THE INVENTION

Problem to be Solved by Invention

[1] The problem corresponding to Background Art [1] is as follows.

With the above-described conventional arrangement, even when unevenness exists on a road surface, it is possible to ride over this by flexing the bending link mechanisms. In the case of use in an agricultural work land, etc., there arises a need to ride over a significant step (a significant level difference) such as a ridge. However, with the above-described conventional arrangement, an intermediate bending portion to which links of the bending link mechanism are pivotally connected protrudes. As a result, in case the vehicle body is to be elevated to the upper side of the step with the traveling device riding over the upper side of the step with flexion of the bending link mechanisms or the vehicle body is to be moved across the ridge to the far side thereof, with the traveling device being hoisted, there arises a risk of the intermediate bending portion coming into contact with the ground surface. As a result, there would arise disadvantages, such as the bending link mechanism being damaged even after a short-time use or the intermediate bending portion getting caught by the ground surface, thus making it impossible to ride over the step smoothly.

In view of the above, it is desired to reduce the risk of damage from contact with the ground surface and also to make it possible to ride over an even significant step (significant level difference) smoothly.

[2] The problem corresponding to Background Art [2] is as follows.

With the conventional arrangement, even when unevenness exists on the traveling road surface, traveling under a stable posture is possible by riding over it with flexion of the bending link mechanism. However, with the above-described conventional arrangement, in the case of traveling on a flat (even) ground surface, the traveling needs to be carried out by driving all of the plurality of wheels which are kept in contact with the ground surface. Thus, it is necessary to drive all the wheels constantly.

Further, since all the wheels are driven, if e.g. the vehicle body is to be moved by being manually pushed on a flat ground surface, the arrangement was disadvantageous in that the movement would require a strong pushing force against such driving means as an electric motor, a hydraulic motor, etc.

Thus, there is a need for an arrangement that allows traveling under a stable posture on an uneven ground surface, but that also allows traveling on a flat ground surface with suppression of the driving three or that allows easy and smooth movement of the vehicle body manually under a stable posture.

[3] The problem corresponding to Background Art [3] is as follows.

The above-described conventional arrangement makes it possible to travel with maintaining the vehicle body under an appropriate posture with flexing of the bending link mechanism even when unevenness exists on the road surface. Thus, it is conceivable to apply such arrangement to an agricultural work vehicle which is to travel on a work land having unevenness on the ground surface. However, it was difficult to apply the supporting arrangement of the above-described conventional arrangement to an agricultural work vehicle.

More particularly, in the case of an agricultural work vehicle, in the vicinity, of the work vehicle, there can be generated a large amount of fine dust such as earth/sand dust generated in association with traveling or fine dust such as floating dust generated from produces in association with a harvesting work thereof, and there can occur also adhesion of water due to rainwater or morning mist, etc. With the above-described conventional arrangement, since the link mechanism for supporting the traveling wheel is driven to be flexed by means of an electric motor incorporated therein, in the case of intrusion of such fine dust, water, etc., this may cause untimely development of a trouble in the electric motor, a reduction mechanism, etc.

In order to avoid such disadvantage, it is conceivable to use a hydraulic cylinder for driving operation of the link mechanism in a working environment where a large amount of fine dust and/or water exists. And, in case the driving operation of the bending link mechanism is effected with using such hydraulic cylinder, a readily conceivable arrangement will be an arrangement in which one end portion of the hydraulic cylinder is supported to a strong and sturdy position of the vehicle body, e.g. its support frame and the other end portion thereof is connected to the object of the operation (link member, etc.) of the bending link mechanism.

With the above-described conceivable arrangement, there arises a disadvantage that the arrangement requires a large disposing space for the hydraulic cylinder, thus inviting enlargement of the supporting arrangement for largely elevating/lowering the traveling device relative to the vehicle body.

Thus, there is a need for a work vehicle that can maintain an appropriate posture through a compact supporting arrangement even in a working environment of a working land with much surface unevenness in which a large amount of fine dust, water, etc. exists.

Solution to the Problem

[1] Solution corresponding to the problem [1] is as follows.

A work vehicle comprising:
a vehicle body;
a plurality of traveling devices for driving traveling;
a plurality of bending link mechanisms supporting the plurality of traveling devices to the vehicle body, with allowing the plurality of traveling devices to be elevated/lowered independently of each other;
a driving mechanism capable of changing respective postures of the plurality of bending link mechanisms independently of each other; and
an idle wheel freely rotatably supported to an intermediate bending portion of each one of the plurality of bending mechanisms.

With the above-described arrangement, by bending the posture of the bending link mechanism by the driving mechanism, the height (relative height) of each one of the plurality of traveling devices relative to the vehicle body can be changed. Whereby, even when traveling on a road surface having unevenness, the traveling is possible with keeping the vehicle body under an appropriate posture as being stably supported on the ground surface by means of the plurality of traveling devices. Further, it also becomes possible to ride over a step or a ridge.

At the time of riding over a step, the intermediate bending portion of the bending link mechanism can sometimes approach the ground surface, such as when the traveling device is caused to ride onto the upper side of the step with flexion of the bending link mechanism or to be moved across the ridge to the far side thereof. But, even when the intermediate bending portion of the bending link mechanism may approach the ground surface, as the idle wheels supported to the intermediate bending portions come into contact with the ground surface, guiding can be provided with smooth rolling of the idle wheels on the ground surface. As a result, there is no such disadvantage of the intermediate bending portion of the bending link mechanism directly coming into contact with the ground, thus getting caught thereby, so that guiding can be provided for smooth riding-over.

Therefore, in the case of e.g. riding over a ridge, with reduced risk of damage due to contact with the ground surface, smooth riding over of a step has become possible.

According to one preferred embodiment:
the bending link mechanism includes a first link having one end portion thereof supported to the vehicle body to be pivotable about a horizontal axis, and a second link having one end portion thereof pivotally connected to the other end portion of the first link to be pivotable about the horizontal axis and having the other end portion thereof supported to the traveling device; and
the idle wheel is supported to a pivot connecting portion between the first link and the second link.

With the above-described arrangement, by changing the pivotal posture of the first link relative to the vehicle body and changing the pivotal posture of the second link relative to the first link, the traveling device can be elevated/lowered relative to the vehicle body. And, since the idle wheel is supported to the pivotal connecting portion between the first link and the second link, even when the pivotal connecting portion between the first link and the second link approaches the ground surface in association with elevating/lowering movement of the traveling device, the idle wheel will come into contact with the ground surface, thus providing smooth guidance. Further, as the pivot shaft for the pivotal connection between the first link and the second link is used also as a pivot shaft for the idle wheel, simplification of the supporting arrangement is made possible.

According to one preferred embodiment:
the driving mechanism includes a first hydraulic cylinder capable of changing the pivotal posture of the first link relative to the vehicle body, and a second hydraulic cylinder capable of changing the pivotal posture of the second link relative to the first link.

With the above-described arrangement, the bending link mechanism has its posture changed by two hydraulic cylinders. A hydraulic cylinder generally has water resistance and dust resistance. Thus, even when water or dust adheres its surface, entrance thereof to the inside can be prevented, so that possibility of e.g. its malfunction due to the adverse influence therefrom is low. Accordingly, even in a work environment where there is the possibility of intrusion of fine dust or water, the posture changing operation can be carried out in a favorable manner.

According to one preferred embodiment:
the driving mechanism is capable of changing the posture of the bending link mechanism, with maintaining a state of an intermediate bending portion of the bending link mechanism being bent toward a vehicle body front/rear intermediate side.

With the above-described arrangement, the posture of the bending link mechanism can be changed with maintaining a state of an intermediate bending portion of the bending link mechanism being bent toward a vehicle body front/rear intermediate side. With this arrangement, since the bending link mechanism will not protrude from the vehicle body toward the front/rear outer side, so the vehicle body front/rear length can be formed compact. Thus, it becomes possible to reduce the risk of the bending link mechanism coming into contact with a produce planted erect in a field to give damage thereto. Incidentally, in this case, the arrangement is not limited to an arrangement in which the intermediate bending portions of all of the plurality of bending link mechanisms are bent toward the vehicle body front/rear intermediate side, the arrangement being understood to be inclusive of an arrangement in which the intermediate bending portion(s) of any one or more of the bending link mechanisms is/are bent toward the vehicle body front/rear intermediate side.

According to one preferred embodiment:
the driving mechanism is capable of changing the posture of the bending link mechanism to an extended posture in which the traveling device and the idle wheel respectively is located on more vehicle body front/rear outer side than the vehicle body front/rear direction outer end.

With the above-described arrangement, when the bending link mechanism is operated into the extended posture, the traveling device and the idle wheel respectively is located on more vehicle body front/rear outer side than the vehicle body front/rear direction outer end. Thus, the vehicle body will be placed at a low position relative to the ground surface. Moreover, the ground contacting width of the traveling device too will be increased in the front/rear direction. Consequently, as the gravity center is lowered, the traveling stability is improved. For instance, when the vehicle travels on a sloped land or the like, traveling is possible even in a place having a significant slope.

According to one preferred embodiment:

the bending link mechanism, the traveling device and the idle wheel respectively are provided one pair on the left and right on the front/rear opposed sides of the vehicle body.

With the above-described arrangement, the ground support can be provided in a stable manner by the total four sets of traveling devices on the left and right on the front and rear opposed sides. Moreover, since each bending link mechanism is provided with an idle wheel, in all of the bending link mechanisms, the risk of damage due to contact with the ground surface is reduced and moreover step can be ridden over smoothly.

Solution corresponding to the problem [2] is as follows.

A work vehicle comprising:

a vehicle body;

a plurality of traveling devices for driving traveling;

a plurality of idle wheels provided in correspondence with the respective plurality of traveling devices;

a supporting mechanism configured to support the plurality of traveling devices to the vehicle body with allowing change in positions of the traveling devices independently of each other, the supporting mechanism being configured to support the plurality of idle wheels to the vehicle body, with allowing change in positions of the idle wheels independently of each other; and a driving mechanism capable of variably operating the supporting mechanism;

wherein the traveling device and the idle wheel corresponding to the traveling device together constitute a traveling functional portion; and wherein the supporting mechanism is switchable, in each one of the plurality of traveling functional portions, a traveling state in which the traveling device is placed on the ground surface and a free moving state in which the idle wheel is placed on the ground surface and the traveling device corresponding thereto is set afloat the ground surface.

With the above-described arrangement, by changing the posture of the supporting mechanism by the driving mechanism, the height (relative height) of each one of the plurality of traveling devices relative to the vehicle body can be changed, so that even when traveling on an uneven ground surface, traveling with maintaining the vehicle body under an appropriate posture is possible with supporting on the ground surface in a stable manner by the plurality of traveling devices.

And, even traveling e.g. on a ground surface providing large traveling resistance, all of the plurality of traveling devices will be set to the traveling state, whereby traveling by large driving force is made possible. On the other hand, when traveling on a ground surface providing little traveling resistance, any one of the plurality of traveling devices will be set to the traveling state and the other traveling devices will be set to the free moving state, whereby the driving force can be suppressed. Moreover, if all of the plurality of traveling devices are switched to the free moving state, the vehicle body can be readily moved manually under a stable posture.

Therefore, it has become possible to allow traveling under a stable posture on an uneven ground surface, yet to allow also traveling on a flat ground surface with suppression of the driving force or to allow easy and smooth movement of the vehicle body manually under a stable posture.

According to one preferred embodiment:

the driving mechanism is switchable between an all traveling state in which all of the plurality of traveling functional portions are set to the traveling state and a partial traveling state in which at least one of the plurality of the traveling functional portions is set to the free moving state.

With the above-described arrangement, in the all traveling state, the vehicle body can be supported in a stable manner. And, in the partial traveling state, traveling drive is possible by at least one traveling functional portion and as the other traveling devices are set to the free moving state, the driving force can be suppressed. In other words, in the case of traveling on a flat traveling surface, there is obtained a further advantage that even with a same driving force, the traveling speed can be improved by concentrating the available power to the traveling functional portion set to the partial traveling state.

According to one preferred embodiment:

the traveling functional portion is provided one pair each on the left and the right on the front and rear opposed sides of the vehicle body; and when the driving mechanism is in the partial traveling state, either one of the traveling functional portion located on the vehicle body front side and the traveling functional portion located on the vehicle body rear side is set to the traveling state, and the other is set to the partial traveling state.

With the above-described arrangement, by means of the total four sets of traveling functional portions provided one pair each on the left and right on the front and rear opposed sides of the vehicle body, the vehicle body can be supported in a stable manner. And, for instance, by setting the two sets of traveling functional portions located on the front or rear side of the vehicle body to the traveling state and setting the two sets of traveling functional portions located on the opposite side to the free moving state, traveling driving can be effected with the two sets of traveling functional portions only.

According to one preferred embodiment:

the supporting mechanism includes a plurality of bending link mechanisms configured to support the plurality of traveling devices to the vehicle body, with allowing elevation and lowering of the plurality of traveling devices independently of each other; and the bending link mechanism includes a first link having one end portion thereof supported to the vehicle body to be pivotable about a horizontal axis, and a second link having one end portion thereof pivotally connected to the other end portion of the first link to be pivotable about a horizontal axis, the second link having the other end portion thereof supported to the traveling device; and the idle wheel is supported to a pivot connecting portion between the first link and the second link.

With the above-described arrangement, the bending link mechanism is constituted of the first link and the second link connected to each other to be pivotal bout a horizontal axis, and by changing the pivotal posture of the first link relative to the vehicle body and changing the pivotal posture of the second link relative to the first link, the posture of the bending link mechanism is changed. As a result, it is possible to ride over a step by causing the traveling device to ride onto the upper side of the step by extending the bending link mechanism or moving it across the step to the far side thereof. Even when the pivotal connecting portion between the first link and the second link approaches the ground surface, the idle wheel will come into contact with the ground surface, so that guiding can be provided with smooth rolling of the idle wheel on the ground surface. Further, there arises no such inconvenience as the link coupling portion coming into contact with the ground surface to get caught thereby, the guiding can be provided for allowing smooth riding over.

According to one preferred embodiment:

the driving mechanism includes a first hydraulic cylinder capable of changing the pivotal posture of the first link relative to the vehicle body, and a second hydraulic cylinder capable of changing the pivotal posture of the second link relative to the first link.

With the above-described arrangement, the bending link mechanism has its posture changed by two hydraulic cylinders. A hydraulic cylinder generally has water resistance and dust resistance. Thus, even when water or dust adheres its surface, entrance thereof to the inside can be prevented, so that possibility of e.g. its malfunction due to the adverse influence therefrom is low. Accordingly, even in a work environment where there is the possibility of intrusion of fine dust or water, the posture changing operation can be carried out in a favorable manner.

[3] Solution corresponding to the problem [3] is as follows.

A work vehicle comprising:

a vehicle body;

a plurality of traveling devices for driving traveling;

a plurality of bending link mechanisms supporting the plurality of traveling devices to the vehicle body, with allowing the plurality of traveling devices to be elevated/lowered independently of each other; and a driving mechanism capable of changing respective postures of the plurality of bending link mechanisms independently of each other;

wherein the bending link mechanism includes a first link having one end portion thereof supported to the vehicle body to be pivotable about a horizontal axis, and a second link having one end portion thereof pivotally connected to the other end portion of the first link to be pivotable about a horizontal axis, the second link having the other end portion thereof supported to the traveling device;

wherein the driving mechanism includes a first hydraulic cylinder capable of changing the pivotal posture of the first link relative to the vehicle body, and a second hydraulic cylinder capable of changing the pivotal posture of the second link relative to the first link;

wherein the first hydraulic cylinder and the second hydraulic cylinder are respectively disposed in concentration in the vicinity of the first link; and wherein one end side of the first hydraulic cylinder is pivotally connected to a supporting member on the vehicle body side via a first coupling member and pivotally connected to one end side of the first link via a second coupling member, the other end side of the first hydraulic cylinder is pivotally connected to the other end side of the first link, and one end side of the second hydraulic cylinder is pivotally connected to one end side of the first link and the other end side of the second hydraulic cylinder is pivotally connected to one end side of the second link via a third coupling member and pivotally connected to the other end side of the first link via a fourth coupling member.

With the above-described arrangement, the bending link mechanism has its posture changed by two hydraulic cylinders. A hydraulic cylinder generally has water resistance and dust resistance. Thus, even when water or dust adheres its surface, entrance thereof to the inside can be prevented, so that possibility of e.g. its malfunction due to the adverse influence therefrom is low. Accordingly, even in a work environment where there is the possibility of intrusion of fine dust or water, the posture changing operation can be carried out in a favorable manner.

As the first hydraulic cylinder and the second hydraulic cylinder are respectively disposed in concentration in the vicinity of the first link, no large space is occupied thereby, so they can be disposed in a compact manner.

And, one end side of the first hydraulic cylinder is pivotally connected to one end side of the first link via a second coupling member. For instance, in the case of an arrangement in which the first hydraulic cylinder and the first link are directly operably coupled to each other, the first hydraulic cylinder may interfere with the pivotal support shaft of the first link, thus restricting the pivotal movement amount of the first link. However, with the above-described arrangement, it is possible to allow extending/contracting operations with circumventing the pivotal support shaft via the second coupling member.

The one end side of the first hydraulic cylinder is pivotally connected also to a supporting member on the vehicle body side via a first coupling member, thus being restricted in its position by the first coupling member and the second coupling member. Thus, the extending/contracting operations will not become unstable. Such cylinder operational condition applies also to that of the second hydraulic cylinder having the third coupling member and the fourth coupling member.

Consequently, while the arrangement allows compact layout of the hydraulic cylinders, the arrangement allows also increase in the amount of pivotal operations of the first link and the second link in response to operations of the hydraulic cylinders, so that the height of the traveling device relative to the vehicle body can be changed largely, so that an appropriate posture can be maintained even in a work land having much surface unevenness.

Therefore, it has become possible for a compact supporting arrangement to maintain an appropriate posture even in a work land having much surface unevenness in a working environment where a lot of fine dust and/or water exists.

According one preferred embodiment:

the work vehicle further comprises a plurality of turning mechanisms configured to support the plurality of respective bending link mechanisms to the vehicle body, each of the turning mechanisms is capable of changing orientation thereof about a vertical axis in unison with the driving mechanism and traveling device associated therewith.

With the above-described arrangement, each one of the plurality of bending link mechanisms integrally including the driving mechanism and the traveling device can be changed in its orientation about a vertical axis. When the orientation of the bending link mechanism is changed, its relative position relative to the driving mechanism or the traveling device remains unchanged. Thus, irrespectively of the turned position, the bending link mechanism can be extended/contracted to change the height of the traveling device.

Therefore, in the course of a turning traveling, unevenness if any on the ground surface can be got over smoothly.

According one preferred embodiment:

the turning mechanism is detachably attached to the vehicle body in unison with the driving mechanism and the traveling device.

With the above-described arrangement, the turning mechanism which integrally includes the driving mechanism and the traveling device can be detached from the vehicle body. Thus, in case the vehicle is mounted on a truck for its transportation, it can be mounted on the truck with its accommodation being facilitated. Further, if a trouble occurs, one driving mechanism alone can be replaced easily.

[4] Further and other features and advantageous effects achieved thereby will become apparent upon reading the following explanation with reference to the accompanying drawings.

BRIEF DESCRIPTION OF THE DRAWINGS

FIG. 18 is an overall side view of a work vehicle according to a further embodiment.

EMBODIMENTS FOR CARRYING OUT THE INVENTION

Next, embodiments of a work vehicle relating to the present invention will be described with reference to the accompanying drawings.

Figure 1:
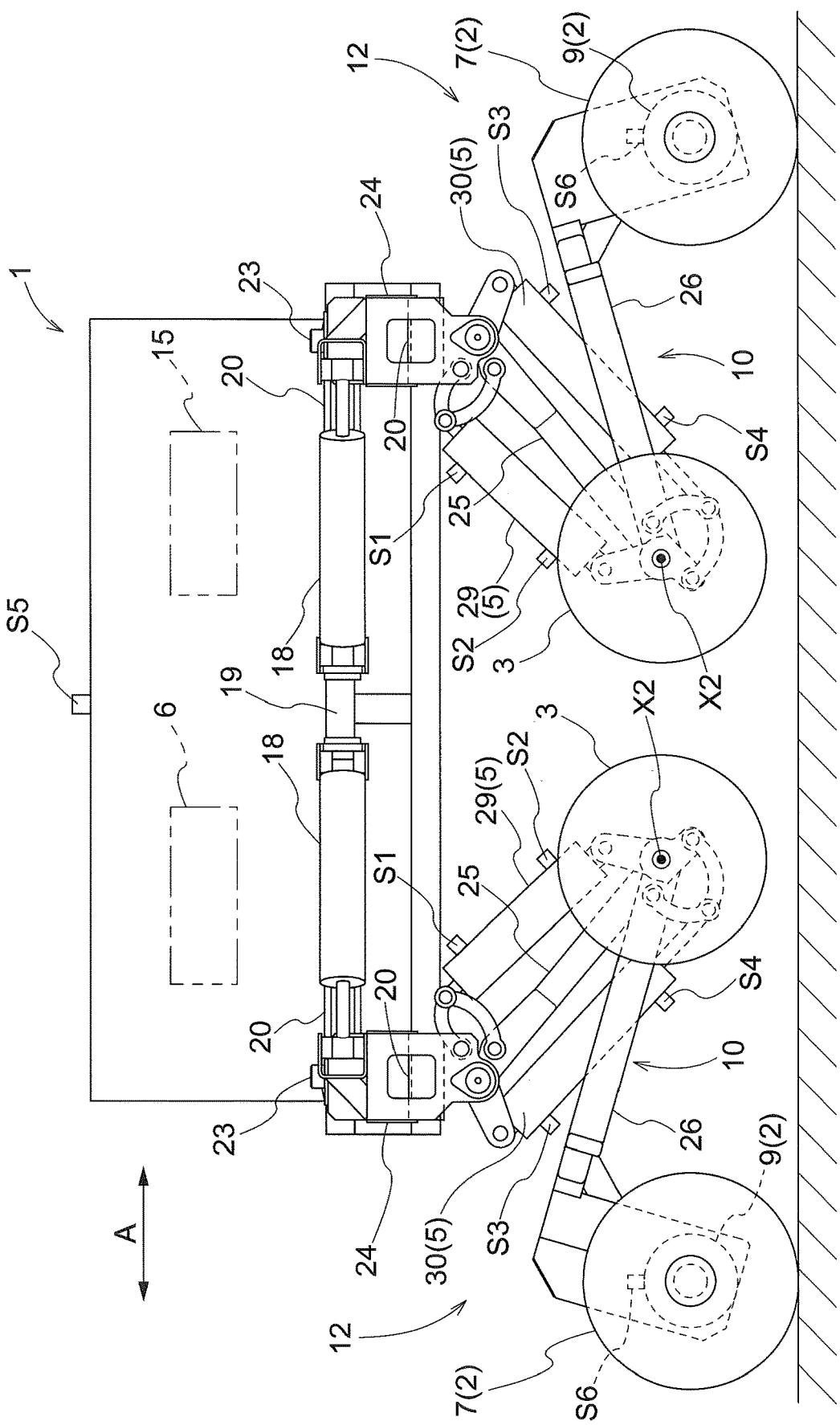
FIG. 1 is an overall side view of a work vehicle.
Figure 2:
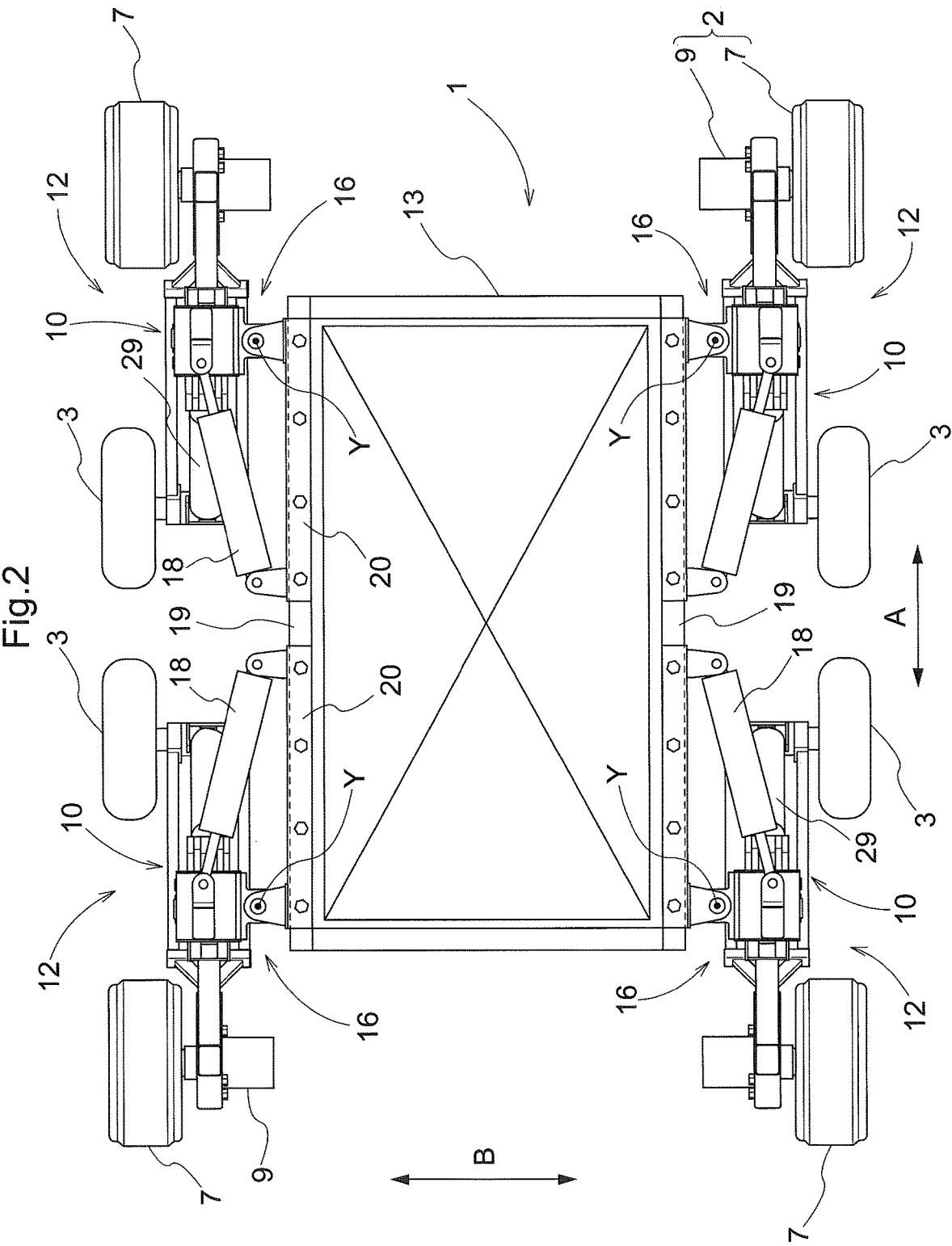
FIG. 2 is an overall plan view of the work vehicle.

As shown in FIGS. 1 and 2, a work vehicle includes a vehicle body 1 substantially in the form of a rectangular-shaped frame for supporting the entire vehicle, a plurality (specifically four sets) of traveling devices 2, a plurality of idle wheels 3 provided in correspondence with the plurality of traveling devices 2, a plurality of bending link mechanisms 10 (an example of a supporting mechanism, an example of a body support portion), a plurality of hydraulic drive type driving mechanisms 5 capable of variably operating the bending link mechanisms 10, and a plurality of working oil supply devices 6 for supplying working oil to the driving mechanisms 5.

Each one of the plurality of traveling devices 2 includes a wheel 7 supported to be rotatable about a horizontal axis and a hydraulic motor 9 mounted within a shaft support portion 8 of the wheel 7. In operation, each traveling device 2 is capable of rotatably driving each corresponding wheel 7 by activating the hydraulic motor 9.

In the instant embodiment, in defining a front/rear direction of the vehicle body, this direction is defined along the traveling direction of the vehicle body. In defining a left/right direction of the vehicle body, this direction is defined as seen along the vehicle body traveling (advancing) direction. Namely, the direction denoted with mark (A) in FIG. 1 is the vehicle body front/rear direction, and the direction denoted with mark (B) in FIG. 2 is the vehicle body left/right direction.

The driving mechanism 5 is capable of changing the posture of each of the plurality of bending link mechanisms 10 independently. The idle wheel 3 is freely rotatably supported to an intermediate bending portion 11 (see FIG. 4) of each of the plurality of bending link mechanisms 10. And, one traveling device 2 and one idle Wheel 3 corresponding to this traveling device 2 together constitute one set of "traveling functional portion 12". And, the one set of traveling functional portion 12 is supported to be changeable in its posture by one bending link mechanism 10. Hence, total of four sets of traveling functional portions 12 are mounted on the front and rear opposed sides of the vehicle body 1, one pair each on the left and right sides. Therefore, the bending link mechanism 10, the traveling device 2 and the idle wheel 3 respectively are provided one pair on the left and right sides on the front and rear opposed sides of the vehicle body 1.

The vehicle body 1 includes a rectangular-shaped frame 13 configured to surround the entire circumference of the vehicle body 1 and to support this vehicle body 1 entirely. The working oil supply device 6 is supported as being accommodated in the inside of the vehicle body 1. Though not detailed therein, the working oil supply device 6 includes a hydraulic pump driven by an engine mounted on the vehicle for delivering working oil to the driving mechanism 5, a plurality of hydraulic control valves for controlling the working oil delivered from the hydraulic pump to the driving mechanism 5, a working oil tank, etc. and caries out feeding/discharging of the working oil to/from the driving mechanism 5 or adjustment of its flow rate.

Inside the vehicle body 1, there is mounted a control device 15 for controlling operations of the working oil supply devices 6. Though these control operations by the control device 15 will not be detailed herein, based on control information inputted via an unillustrated manual input device or control information set and stored in advance, the feeding states of the working oil to the driving mechanisms 5 and the hydraulic motors 9 are controlled.

Next, a supporting arrangement for supporting the traveling devices 2 to the vehicle body 1 will be described.

The plurality (specifically four sets) traveling devices 2 are supported to be elevated/lowered independently relative to the vehicle body 1 via the bending link mechanisms 10. Each bending mechanism 10 is supported to the vehicle body to be changeable in its orientation about a vertical axis by a turning mechanism 16.

More particularly, the bending link mechanism 10 is supported to the support frame 13 to be pivotable about a vertical axis Y via the turning mechanism 16. The turning mechanism 16 includes a vehicle body side support portion 17 (see FIG. 3 and FIG. 4) which is connected to the support frame 13 and pivotally supports the bending link mechanism 10, and a turning operation hydraulic cylinder 18 (to be referred to also as a "turning cylinder 18" hereinafter) for turning the bending link mechanism 10.

More particularly, as shown in FIGS. 3, 4, 5 and 6, the vehicle body side support portion 17 includes: connecting members 20 engageable with a pair of upper and lower angular cylindrical front/rear oriented frame bodies 17 provided at lateral side portions of the support frame 13 for clamping these frame bodies 17 from the lateral outer side and detachably bolt-connected to each other; an outer side pivot bracket 21 disposed at an outer side portion in the vehicle body front/rear direction of the connecting members 20; an inner side pivot bracket 22 disposed at an inner side portion in the vehicle body front/rear direction of the connecting members 20; and a vertically oriented pivot support shaft 23 supported to the outer side pivot bracket 21, whereby the vehicle body side support portion 17 supports the bending link mechanism 10 with allowing its pivotal movement about the axis Y of the pivot support shaft 23.

The bending link mechanism 10 includes a base end portion 24 supported to the vehicle body side support portion 17 with its vertically position fixed and being pivotable about the vertical axis Y, a first link 25 having one end portion thereof supported to a lower portion of the base end portion 24 to be pivotable about a horizontal axis X1, and a second link 26 having one end portion thereof supported to the other end portion of the first link 25 to be pivotable about a horizontal axis X2 and having the other end portion thereof supported to the traveling device 2.

More particularly, the base end portion 24 is provided in the form of a rectangular-shaped frame, and at a position offset to the vehicle body lateral width inner side, the base end portion 24 is supported to the outer side pivot bracket 21 of the vehicle body side support portion 17 to be pivotable about the vertical axis Y via the pivot support shaft 23. The turning cylinder 18 has its one end portion pivotally connected to the inner side pivot bracket 22 and has its outer end portion pivotally connected at a laterally offset position to the pivot support shaft 23 of the base end portion 24.

Across the left and right opposed end portions of the base end portion 24, a support shaft 27 provided on one end side of the first link 25 is pivotally supported, and the first link 25 is connected to a lower portion of the base end portion 24 to be pivotable about the axis of the support shaft 27.

Figure 4:
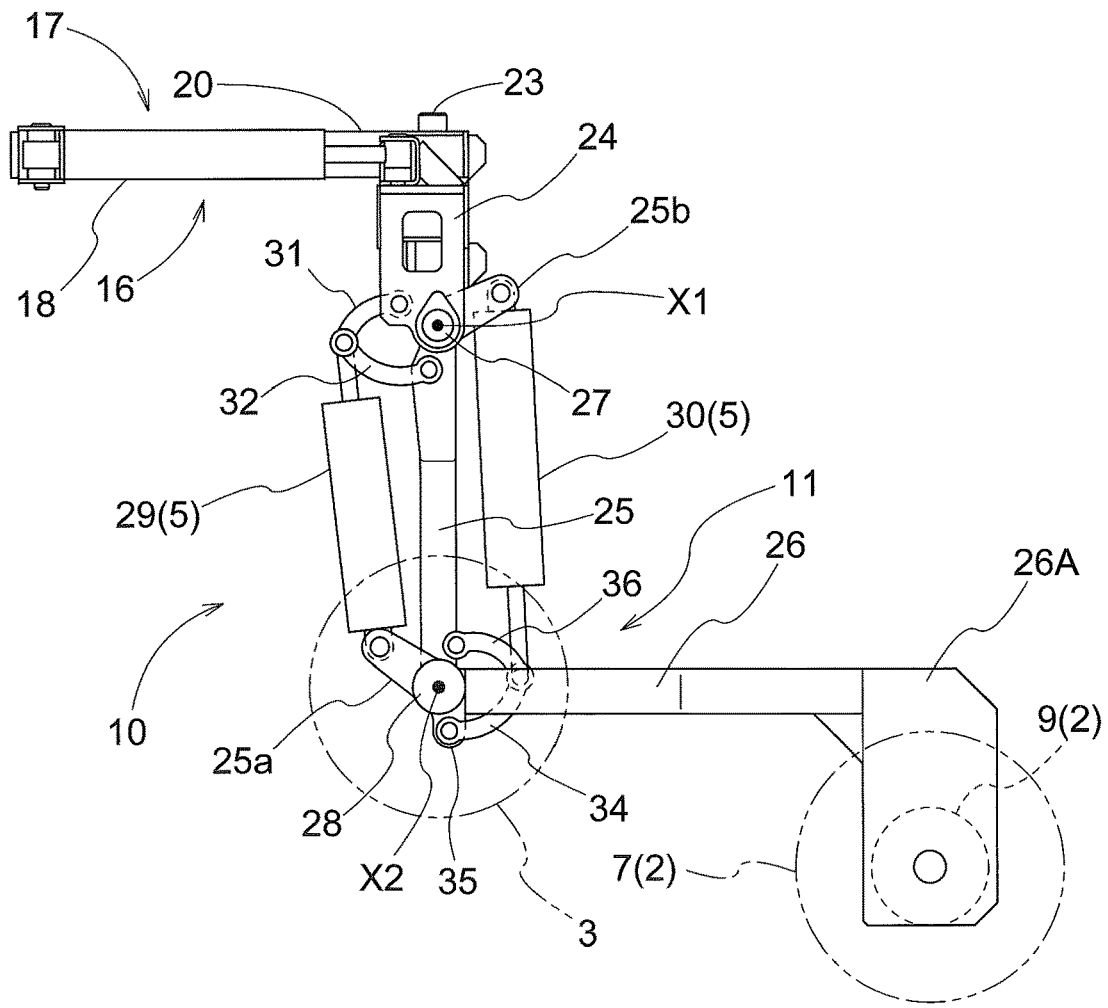
FIG. 4 is a side view of the bending link mechanism.
Figure 5:
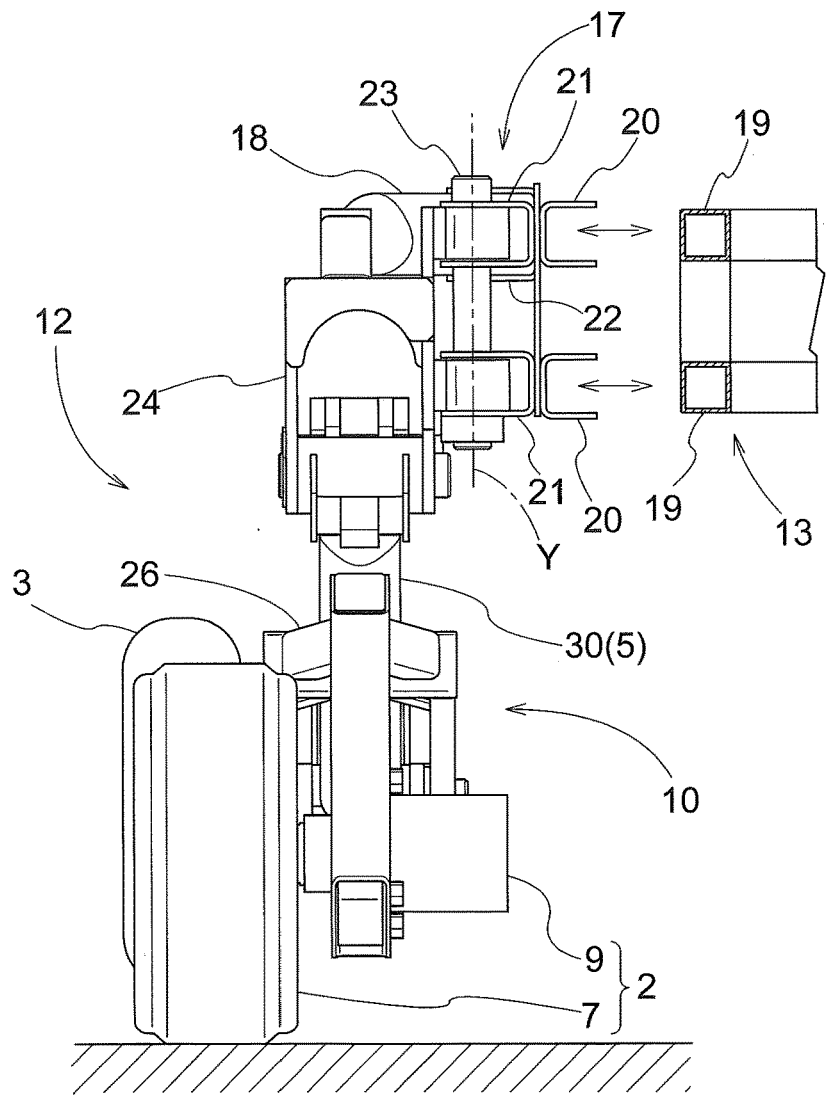
FIG. 5 is a front view showing the bending link mechanism under its dismounted state.
Figure 6:
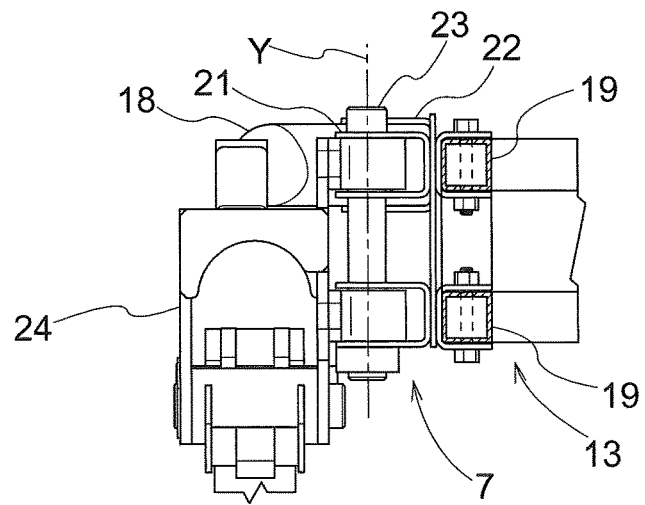
FIG. 6 is a front view showing the bending link mechanism under its mounted state.

As shown in FIG. 4, the first link 25 includes a base end side arm portion 25b and an other end side arm portion 25a. At one end side portion of the first link 25, there is integrally formed the base end side arm portion 25b extending obliquely upper outwards. At the other end side portion of the first link 25, there is integrally formed the other end side arm portion 25a extending obliquely upper outwards.

Figure 3:
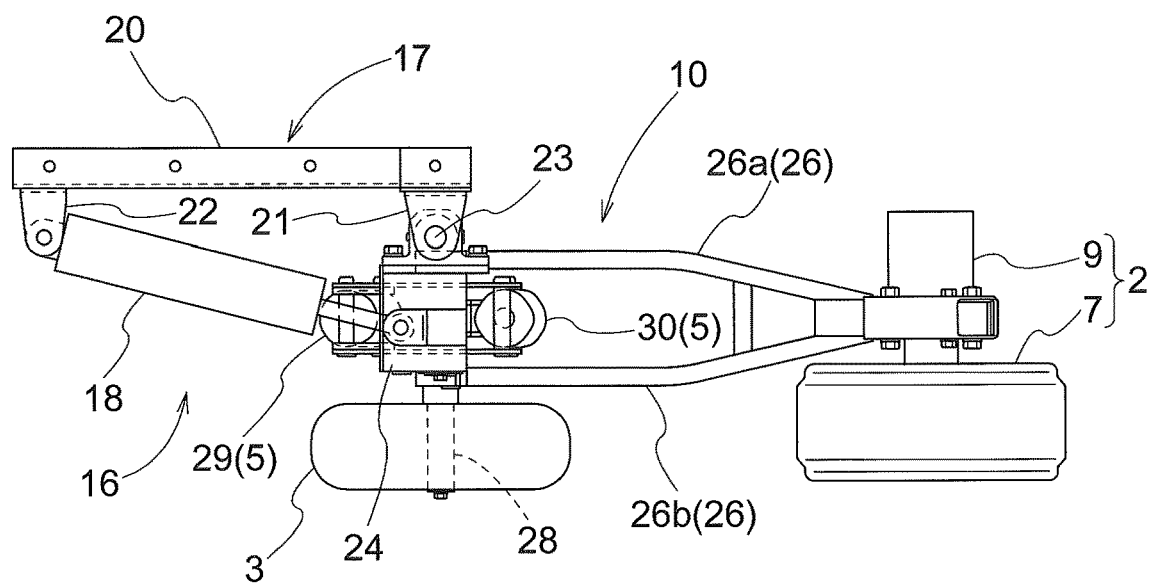
FIG. 3 is a plan view of a bending link mechanism.

As shown in FIG. 3, the second link 26 is formed bifurcated as seen in the plan view, with a pair of left and right band-plate like plate bodies 26a, 26b. The connecting portion of the second link 26 to the first link 25 is separated with a spacing provided by the pair of plate bodies 26a, 26b, In the area bound between the pair of plate bodies 26a, 26b, a connecting support shaft 28 to be connected to the first link 25 is pivotally supported. At the pivotal side end portion opposite to the connecting portion of the second link 26 to the first link 25, the traveling device 2 is supported. As shown in FIG. 4, the pivotal movement side end portion of the second link 26, there is formed an L-shaped extension portion 26A which extends in an approximately L-shape in the direction away from the vehicle body 1 and at the extension side end portion of this L-shaped extension portion 26A, the traveling device 2 is supported.

For each one of the plurality (four sets) of bending link mechanisms 10, the driving mechanism 5 is provided. As shown in FIG. 1 and FIG. 4, the driving mechanism 5 includes a first hydraulic cylinder 29 capable of changing the pivotal posture of the first link 25 relative to the vehicle body 1 and a second hydraulic cylinder 30 capable of changing the pivotal posture of the second link 26 relative to the first link 25. The first hydraulic cylinder 29 and the second hydraulic cylinder 30 are disposed in concentration in the vicinity of the first link 25.

As seen in a plan view, the first link 25, the first hydraulic cylinder 29 and the second hydraulic cylinder 30 are arranged between the pair of plate bodies 26a, 26b of the second link 26. As shown in FIG. 3 and FIG. 4, the first hydraulic cylinder 29 is located on the vehicle body front/rear direction inner side relative to the first link 25 to extend along the longitudinal direction of the first link 25. One end portion of the first hydraulic cylinder 29 is operably connected to a lower portion of the base end portion 24 via an arc-shaped first coupling member 31. The one end portion of the first hydraulic cylinder 29 is operably connected to a base end side portion of the first cylinder 25 via another second coupling member 32. The first coupling member 31 and the second coupling member 32 respectively have opposed end portions thereof pivotally connected to be pivotable relative to each other. The other end portion of the first hydraulic cylinder 29 is operably connected to the other end side arm portion 25a formed integral with the first link 25.

The second hydraulic cylinder 30 is disposed on the opposite side to the first hydraulic cylinder 29, namely, on the vehicle body front/rear direction outer side relative to the first link 25 and substantially extends along the longitudinal direction of the first link 25. One end portion of the second hydraulic cylinder 30 is operably connected to the base end side arm portion 25b formed integral on the base end side of the first link 25. The other end portion of the second hydraulic cylinder 30 is operably connected to the arm portion 35 formed integral at the base end side portion of the second link 26 via a third coupling member 34. The other end portion of the second hydraulic cylinder 30 is operably connected also to the pivotal movement end side portion of the first link 25 via another fourth coupling member 36. The third coupling member 34 and the fourth coupling member 36 respectively have opposed end portions thereof pivotally connected to be pivotable relative to each other.

When the first hydraulic cylinder 29 is extended or contracted with an operation of the second hydraulic cylinder 30 being stopped, the first link 25, the second link 26 and the traveling device 2 will respectively pivot together while maintaining the relative postures thereof, about the horizontal axis X1 where they are pivotally connected to the base end portion 24. When the second hydraulic cylinder 30 is extended or contracted with an operation of the first hydraulic cylinder 29 being stopped, the second link 26 and the traveling device 2 will pivot, with maintaining the posture of the first link 25 constant, together about the horizontal axis X2 at the connecting portion between the first link 25 and the second link 26.

At the intermediate bending portion 11 of each one of the plurality (four sets) of bending link mechanisms 10, the idle wheel 3 is supported. As shown in FIG. 1 and FIG. 2, the idle wheel 3 is configured as a wheel having an approximately same outside diameter as the wheel 7 of the traveling device 2. As shown in FIG. 3, the connecting support shaft 28 which pivotally connects the first link 25 to the second link 26 is formed to extend to protrude on more vehicle body lateral width direction outer side than the second link 26. And, at the extending protruding portion of the connecting support shaft 28, the idle wheel 3 is supported to be freely rotatable. Namely, the connecting support shaft 28 which pivotally connects the first link 25 to the second link 26 functions also as a pivot support shaft of the idle wheel 3, thus simplification of the arrangement through co-use of a component being sought for.

As shown in FIG. 3, the turning cylinder 18 has one end portion pivotally connected to the inner side pivot bracket 22 and has the other end portion pivotally connected to a position of the base end portion 24 offset laterally relative to the pivot support shaft 23.

Figure 7:
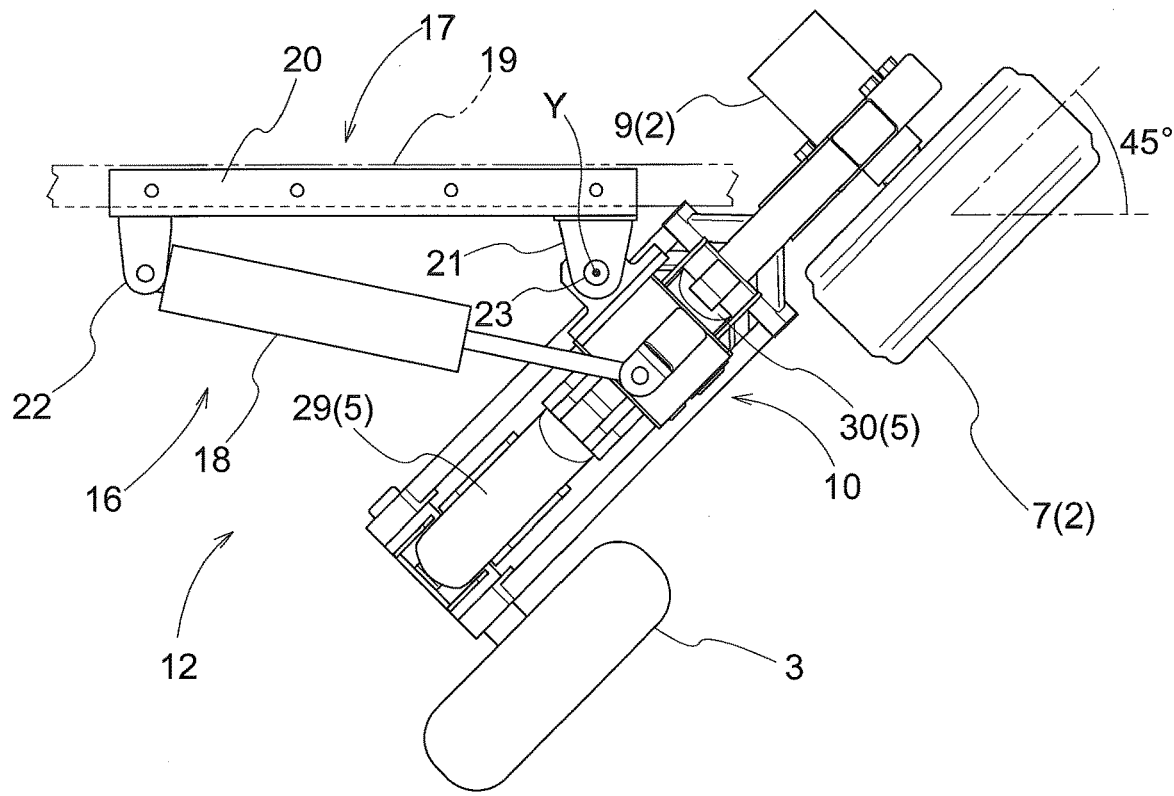
FIG. 7 is a plan view showing a left turning state provided by a turning mechanism.
Figure 8:
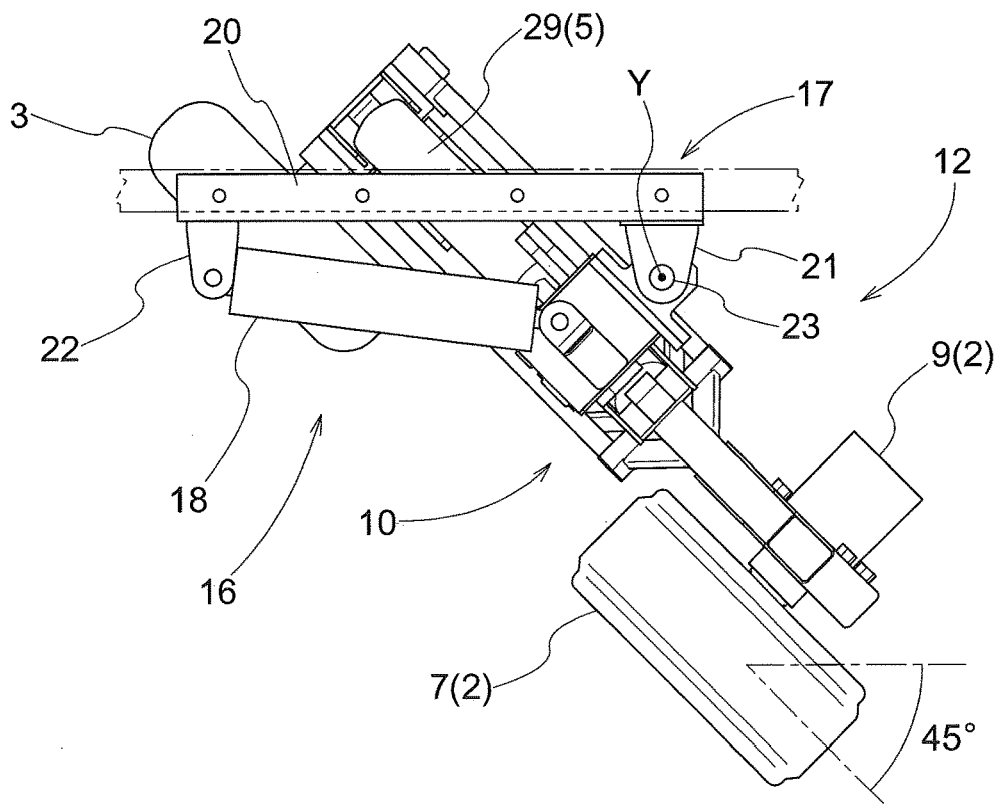
FIG. 8 is a plan view showing a right turning state provided by the turning mechanism.

As shown in FIG. 7 and FIG. 8, the bending link mechanism 10, the traveling device 2, the idle wheel 3 and the driving mechanism 5 respectively are supported altogether to the outer side pivot bracket 21 to be pivotable about the axis Y of the pivot shaft support 23. And, by extending/contracting the turning cylinder 18, the above members will be pivoted altogether. With this, it is possible to effect a turning operation from a straight traveling state in which the traveling device 2 is oriented along the front/rear direction to a left turning direction or a right turning direction by about 45 degrees, respectively.

When the bolt connection of the coupling member 20 to a front/rear oriented frame body 19 is released, the turning mechanism 16, the bending link mechanism 10, the traveling device 2, the idle wheel 3 and the driving mechanism 5, as being integrally assembled to each other, can now be detached from the vehicle body 1. Conversely, when the coupling member 20 is bolt-connected to the front/rear oriented frame body 19, the above-cited respective devices/components, as being assembled integrally to each other, can now be attached to the vehicle body 1.

From the working oil supply device 6, working oil is supplied respectively to the first hydraulic cylinder 29 and the second hydraulic cylinder 30 of each one of the plurality of bending link mechanism 10. Feeding and discharging of the working oil are effected by the hydraulic control valve, so that the first hydraulic cylinder 29 and the second hydraulic cylinder 30 can be extended/contracted. This hydraulic control valve is controlled by the control device 15.

Also, as flow rate of the working oil is controlled by the hydraulic control valve corresponding to the hydraulic motor 9, the rotational speed of the hydraulic motor 9, namely, of the wheel 7 can be changed. The hydraulic control valve is controlled by the control device 15 based on e.g. control information inputted by a manual operation or preset and stored control information, etc.

As shown in FIG. 1, this work vehicle includes various kinds of sensors. Specifically, the work vehicle includes a first cap-side pressure sensor S1 and a first head-side (counter-cap side) pressure sensor S2 which are provided in the first hydraulic cylinder 29; and a second cap-side pressure sensor S3 and a second head-side (counter-cap side) pressure sensor S4 which are provided in the second hydraulic cylinder 30. The firster cap-side pressure sensor S1 detects an oil pressure of a cap-side chamber of the first hydraulic cylinder 29. The first head-side pressure sensor S2 detects an oil pressure of a head-side chamber of the first hydraulic cylinder 29. The second cap-side pressure sensor S3 detects an oil pressure of a cap-side chamber of the second hydraulic cylinder 30. The second head-side pressure sensor S4 detects an oil pressure of a head-side chamber of the second hydraulic cylinder 30. Further, though not shown, the above-described hydraulic cylinders 18, 29, 30 respectively incorporates a stroke sensor capable of detecting an extension/contraction stroke amount, thus feeding back an operational state to the control device 15.

Incidentally, the attaching positions of the respective pressure sensors S1, S2, S3, S4 are not limited to the positions described above. It suffices for the respective pressure sensors S1, S2, S3, S4 to be capable of detecting (estimating) an oil pressure in the cap-side chamber or the head-side chamber, and so these sensors may be disposed within pipes extending from the valve mechanism to the cap-side chamber or the head-side chamber corresponding thereto.

Based on the detection results of these sensors, forces needed for supporting the vehicle body 1 will be calculated. Then, based on the calculation results, supplies of the working oil to the respective first cylinder 29 and the respective second cylinder 30 will be controlled. Specifically, based on the detection value of the first cap-side pressure sensor S1 and the detection value of the first head-side pressure sensor S2, a pressure difference between the cap-side chamber and the head-side chamber of the first hydraulic cylinder 29 is obtained and from this pressure difference, a cylinder propelling force for the first hydraulic cylinder 29 will be calculated. Similarly, based on the detection value of the second cap-side pressure sensor S3 and the detection value of the second head-side pressure sensor S4, a pressure difference between the cap-side chamber and the head-side chamber of the second hydraulic cylinder 30 is obtained and from this pressure difference, a cylinder propelling force for the second hydraulic cylinder 30 will be calculated, similarly for the first hydraulic cylinder 29.

The vehicle body 1 mounts an acceleration sensor S5 which can be comprised of e.g. a three-axis acceleration sensor. Based on a detection result of this acceleration sensor S5, a front/rear, left/right tilt of the vehicle body 1 is detected and based on the result of this detection, the posture of the vehicle body 1 is controlled. Namely, supplies of the working oil to the respective first hydraulic cylinder 29 and the respective second hydraulic cylinder 30 will be controlled such that the posture of the vehicle body 1 may become a target posture.

The traveling device 2 includes a rotation sensor S6 for detecting a rotational speed of the wheel 7. Based on a rotational speed of the wheel 7 calculated by the rotation sensor S6, the supply of the working oil to the hydraulic motor 9 is controlled so that the rotational speed of the wheel 7 may become a target speed.

As described above, the work vehicle of this embodiment is configured such that the traveling device 2 is supported via the bending link mechanism 10 and also that the posture of the bending link mechanism 10 is changed by the hydraulic cylinders 29, 30 as the hydraulic drive type driving mechanism 5 and moreover that the traveling drive is carried out by means of a hydraulic motor. Therefore, the work vehicle is suitable for an agricultural work as being affected little by water or fine dust, etc.

As exemplary uses of the work vehicle having such configurations, there are modes of traveling as follows.

<Mode of Traveling on Flat Ground Surface>

Figure 9:
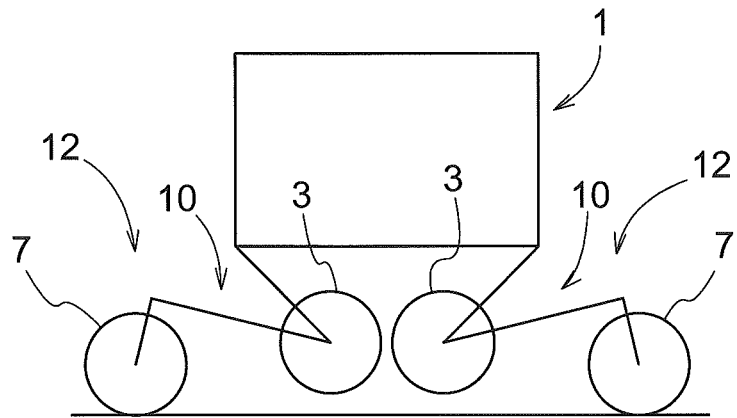
FIG. 9 is an explanatory view of a four-wheel traveling state.
Figure 10:
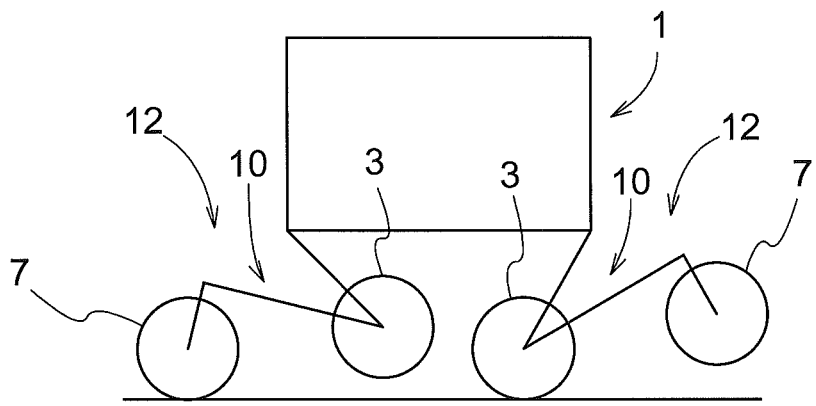
FIG. 10 is an explanatory view of a two-wheel traveling state.
Figure 11:
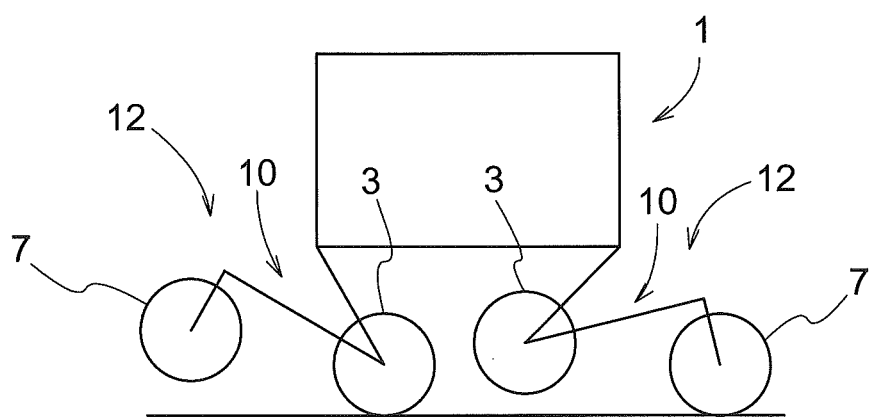
FIG. 11 is an explanatory view of the two-wheel traveling state.

In the case of traveling on a flat ground surface, as shown in FIGS. 9, 10 and 11, the traveling is possible in any one of different kinds of traveling modes, Namely, as shown in FIG. 9, the traveling mode can be a four-wheel traveling mode in which all of the four traveling devices 2 (specifically the wheels 7) are placed in contact with the ground surface and also all of the four idle wheels 3 are set afloat the ground surface. Alternatively, as shown in FIG. 10, the traveling mode can be a two-wheel traveling mode in which the traveling device 2 (wheel 7) located on one side in the vehicle body front/rear direction is placed in contact with the ground surface and the idle wheel 3 corresponding to this traveling device 2 (wheel 7) is set afloat the ground surface and also the traveling device 2 (wheel 7) located on the other side in the vehicle body front/rear direction is set afloat the ground surface and the idle wheel 3 corresponding to that traveling device 2 (wheel 7) is placed on contact with the ground surface.

The two wheel traveling state also can be a state in which the relationship between the traveling device 2 (wheel 7) and the idle wheel 3 is reversed in the vehicle body front/rear direction. That is, as shown in FIG. 11, it can be a state in which the traveling device 2 (wheel 7) located on one side in the vehicle body front/rear direction is placed in contact with the ground surface and the idle wheel 3 corresponding to this traveling device 2 (wheel 7) is set afloat the ground surface and also the traveling device 2 (wheel 7) located on the other side in the vehicle body front/rear direction is set afloat the ground surface and the idle wheel 3 corresponding to this traveling device 2 is placed in contact with the ground surface.

More particularly, the bending link mechanism 10 can be configured in each one of the four sets of traveling functional portions 12 to be switchable between a traveling state in which the traveling device 2 (wheel 7) is placed in contact with the ground surface and the idle wheel 3 corresponding thereto is set afloat the ground surface; and a free moving state in which the idle wheel 3 is placed in contact with the around surface and the traveling device 2 (wheel 7) corresponding thereto is set afloat the ground surface.

In the four wheel traveling state described above, all of the four sets of traveling functional portions 12 are set to the traveling state. In the two wheel traveling state described above, two sets of traveling functional portions 12 on one side in the vehicle body front/rear direction are set to the traveling state and two sets of the traveling functional portions 12 on the opposite side are set to the free traveling state.

Further, in addition to the four wheel traveling state and the two wheel traveling state described above, it is also possible to switch to a "partial traveling state" in which three traveling functional portions 12 of the total four traveling functional portions 12 are set to the traveling state and the other remaining one traveling functional portion 12 is set to the free moving state. With this setting, it is possible to keep three traveling functional portions 12 in contact with the ground surface in a stable manner and to e.g. extend one traveling functional portion 12 to an upper side of a step, etc. at the same time. In addition to the above, it is also possible to switch three traveling functional portions 12 of the total four traveling functional portions 12 to the free moving state and to set the remaining one traveling functional portion 12 to the traveling state.

In short, the driving mechanism 5 can be switched over between an "all traveling state" in which all of the four traveling functional portions 12 are set to the traveling state and the "partial traveling state" in which at least one of the fourth traveling functional portions 12 is set to the traveling state and the remaining others are set to the free moving state.

Figure 12:
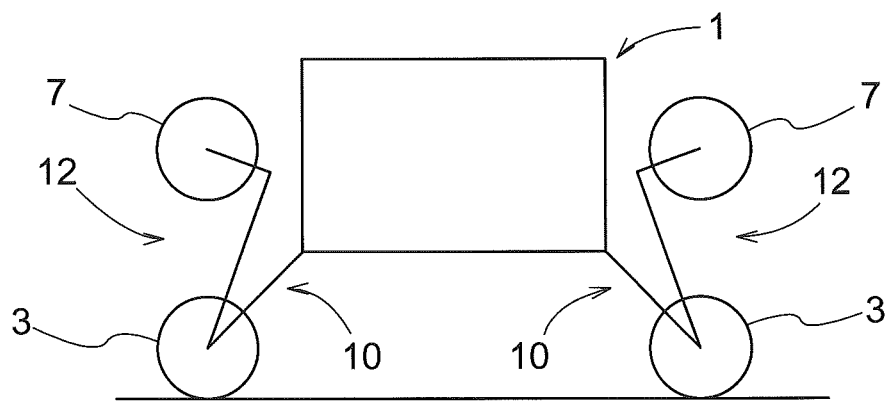
FIG. 12 is a side view of a free moving state.

In addition to the traveling modes described above, as shown in FIG. 12, it is also possible to set and use all of the four sets of traveling functional portions 12 to the free moving state. In this case, driving traveling is not possible, but it is possible to easily move the vehicle by pushing it hands.

With this work vehicle, in addition to the above-described traveling on a flat ground surface, the work vehicle can be used in following modes as "special" uses thereof.

<Two-Leg Erection Mode>

It is possible to place the traveling device 2 at a high place by greatly tilting the vehicle body 1.

Figure 13:
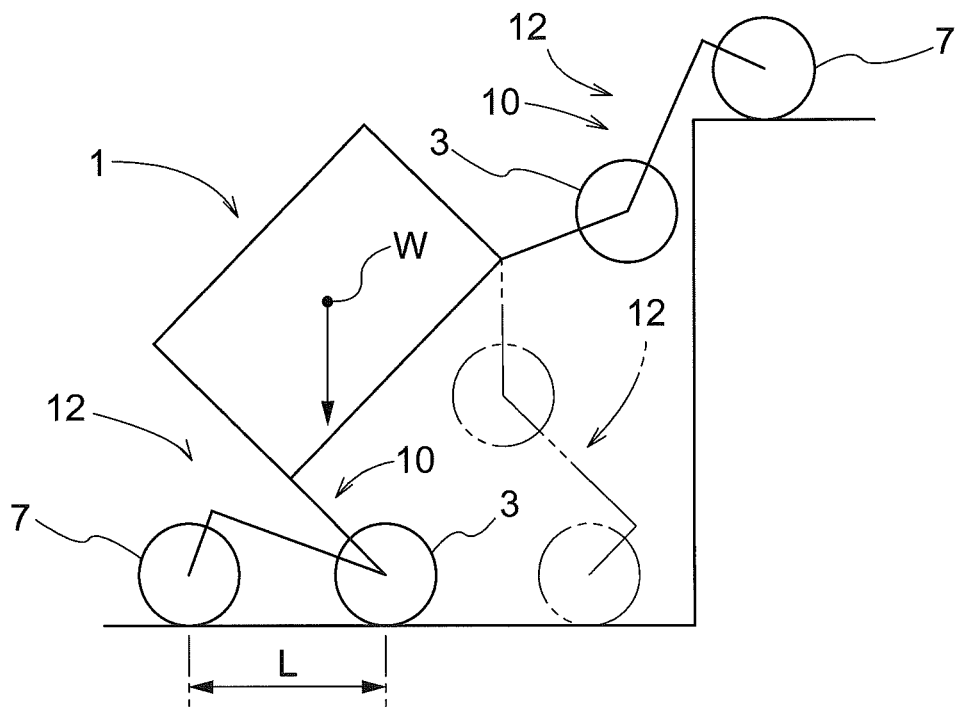
FIG. 13 is a side view of step riding-over state.

Namely, as shown in FIG. 13, when all of the traveling devices 2 and the idle wheels 3 of the two sets of traveling functional portions 12 on one side in the vehicle body front/rear direction are placed in contact with the ground surface, the vehicle body 1 is greatly tilted to raise the other side thereof with using the bending link mechanisms 10 which support the two sets of traveling functional portions 12 on the other side in the vehicle body front/rear direction. And, when the vehicle body becomes tilted until a gravity center position W of the vehicle body 1 is located within a ground contacting width L defined by the two sets of traveling function portions 12 on the other side, the bending link mechanisms 10 supporting the two sets of traveling functional portions 12 on the other side can be extended largely to place the traveling devices 2 onto a ground surface which is located at a high place.

Figure 14:
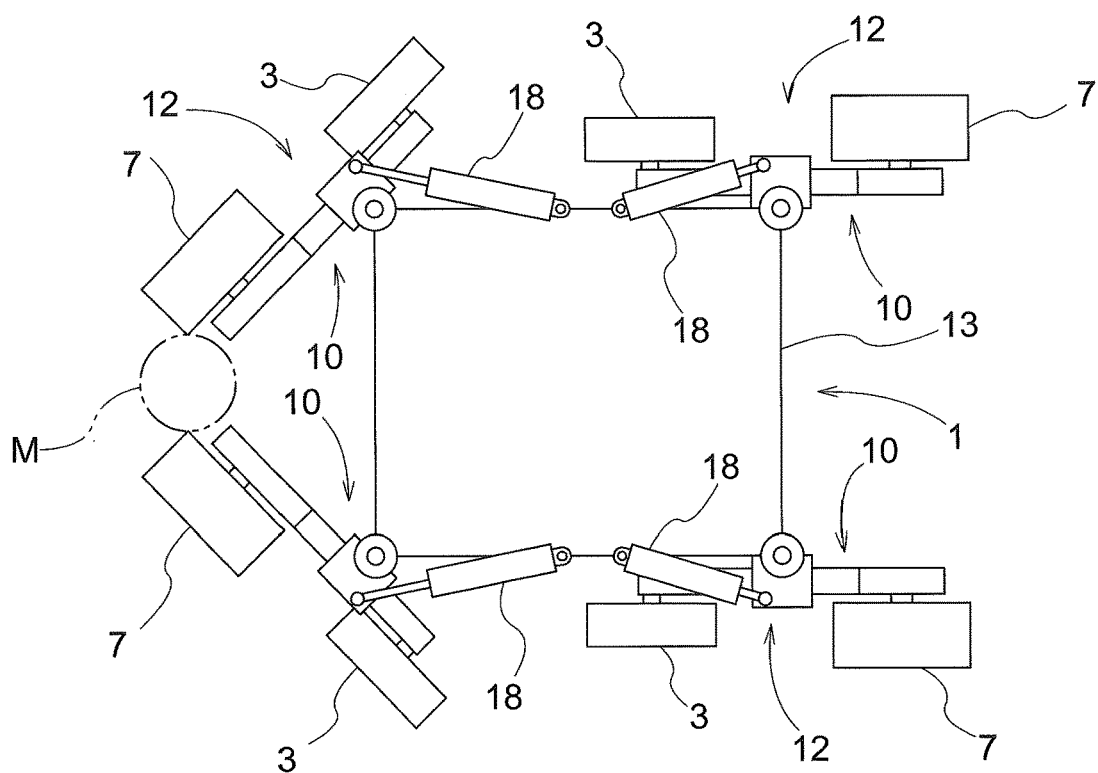
FIG. 14 is a plan view of an object conveying state.
Figure 15:
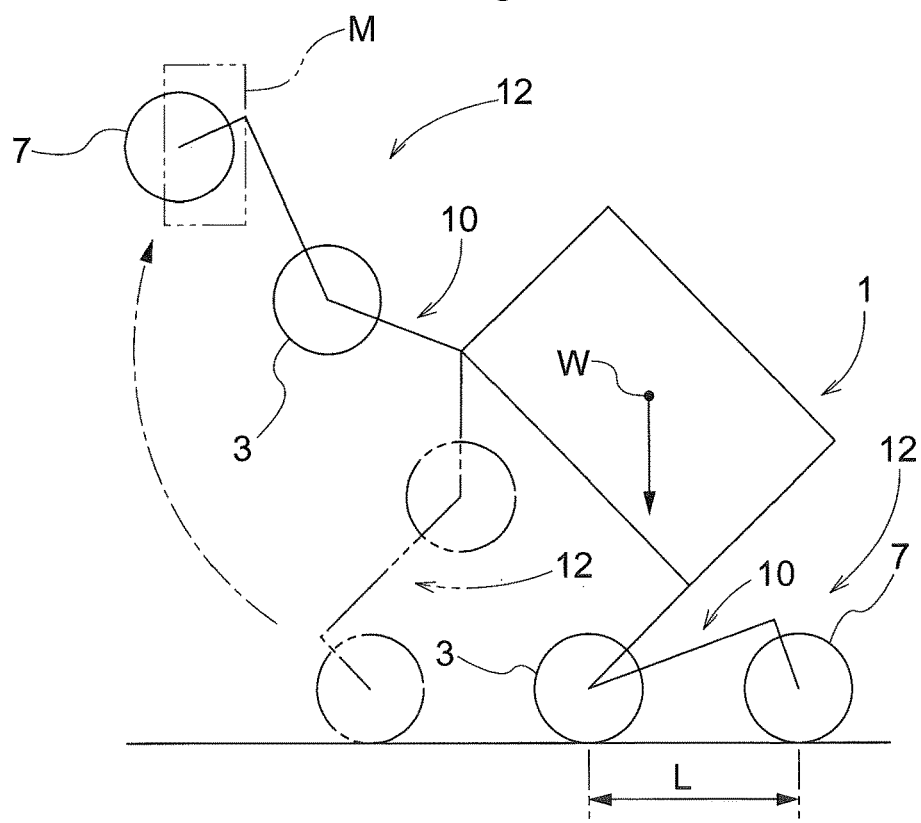
FIG. 15 is a side view of the object conveying state.

In this two leg erect state, in addition to the mode of riding over to a high place, as shown in FIG. 14 and FIG. 15, it is also possible to carry out a movement for hoisting an object. Namely, as described above, the vehicle body 1 will be greatly tilted with keeping the traveling devices 2 and the idle wheels 3 of the two sets of traveling functional portions 12 on one side in the vehicle body front/rear direction in contact with the ground surface, until the gravity center position W of the vehicle body 1 is located within the ground contacting width L defined by the two sets of traveling functional portions 12 on one side. Further, in the two sets of traveling functional portions 12 on the other side in the vehicle body front/rear direction, turning operations are carried out so as to bring the traveling functional portions 12 on the left and right opposed sides closer to each other. By the traveling devices 2 of the two sets of traveling functional portions 12 on the other side in the vehicle body front/rear direction, an object M as a conveying subject will be clamped and then hoisted. With the object M being clamped, it is possible to travel and move with keeping the posture of the vehicle body by the two sets of traveling functional portions 12 on one side in the vehicle body front/rear direction, so that the object M can be conveyed.

<Slope Face Traveling Mode>

Figure 16:
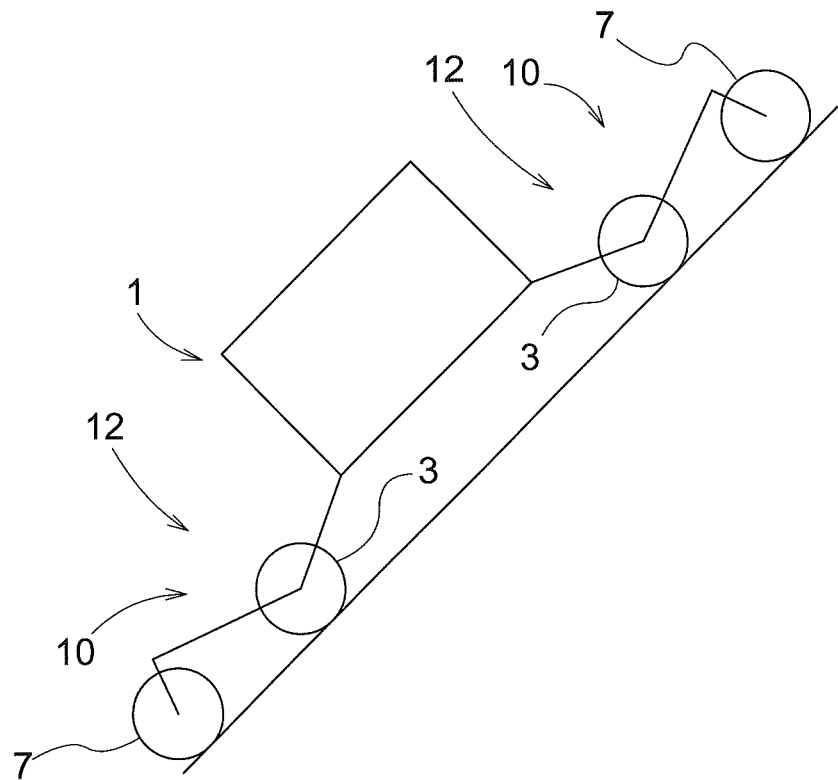
FIG. 16 is a side view of a slope face traveling state.

As shown in FIG. 16, in all of the four sets of traveling functional portions 12, the postures of the bending link mechanisms 10 will be switched to the extended postures in which the traveling devices 2 and the idle wheels 3 are respectively located on more vehicle body front/rear direction outer side than the vehicle body front/rear direction outer end portions. With all of the traveling devices 2 and the idle wheels 3 being placed in contact with the ground surface, the first links 25 and the second links 26 will be brought as close as possible to the horizontal posture, thereby to lower the height of the vehicle body 1 to a low position. Under this condition, the vehicle will travel while climbing up a slope face. In this traveling mode, the ground contacting width along the vehicle body front/rear direction is increased, so that even on a sloped face having a significant inclination, the vehicle can travel in a stable manner without toppling.

<Step Riding-Over Mode>

All of the traveling devices 2 and the idle wheels 3 of three sets of traveling functional portions 12 of the total four sets of traveling functional portions 12 will be placed in contact with the ground surface, so as to support the vehicle body 1 on the ground surface in a stable manner. Under this condition, the bending link mechanism 10 supporting the remaining one traveling function portion 12 will be extended largely to allow each traveling device 2 to ride onto an upper face of a step, so that the vehicle can ride over the step, as shown in FIG. 13 for instance. While the bending link mechanism 10 of each set of traveling functional portions 12 is extended, each set of traveling functional portions 12 will be moved to ride onto the upper face of a higher step, thereby to ride over the step. FIG. 13 illustrates a case of the high step, but the vehicle body 1 can ride over a step if it is low.

<Stride-Over Traveling State>

Figure 17:
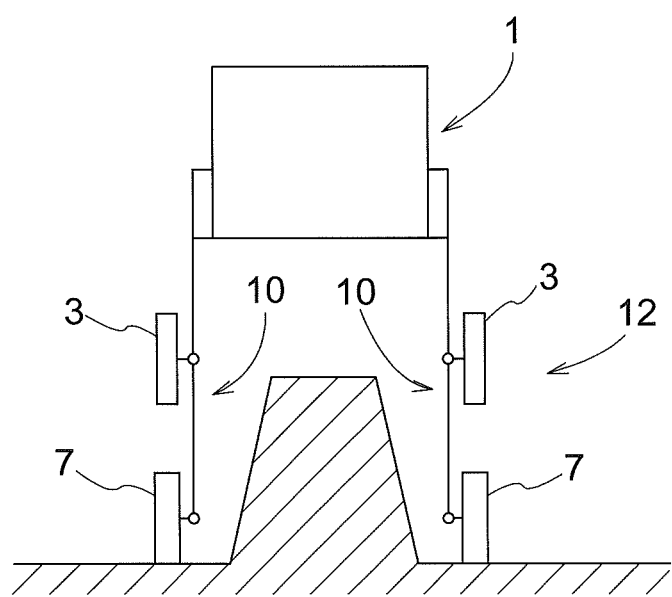
FIG. 17 is a front view of a stride-over traveling state.

As shown in FIG. 17, in all of the four sets of the traveling functional portions 12, the bending link mechanisms 10 will be extended largely, so as to elevate the vehicle body 1 far above the ground surface. For instance, a utility work can be carried out with keeping the vehicle body 1 striding across above a ridge. Hence, even when an agricultural produce planted on the ridge has grown, it is still possible to carry out a chemical agent spraying, a harvesting work from above the produce.

Incidentally, though not described in details, in the case of traveling in the various modes such as those described above, the control device 15 will control operations of the respective hydraulic cylinders 18, 29, 30 and the respective hydraulic motors 9, in a mode corresponding to instructed contents, based on the control information inputted by a manual operation or preset and stored control information, etc.

OTHER EMBODIMENTS (1) In the foregoing embodiment, the plurality of bending link mechanisms 10 are supported to lower portions of the vehicle body 1. In place of this arrangement, as shown in FIG. 18, the plurality of link mechanisms 10 may be supported to upper portions of the vehicle body 1. Further, as shown in FIG. 18, the idle wheel 3 can be formed with a diameter smaller than the wheel of the traveling device 2.

(2) In the foregoing embodiment, the driving mechanism 5 includes the first hydraulic cylinder 29 and the second hydraulic cylinder 30. In place of this arrangement, it is also possible to arrange such that a hydraulic motor is provided at a pivot support portion of the bending link mechanism 10 so that the posture of the bending link mechanism 10 is changed by this hydraulic motor.

(3) In the foregoing embodiment, the traveling device 2 is driven by the hydraulic motor 9. In place of this arrangement, it is also possible to arrange e.g. such that power of an engine mounted on the vehicle is fed to the wheels 7 via some mechanical transmission mechanism such as a chain transmission mechanism, etc.

(4) In the foregoing embodiment, the traveling device 2 includes one wheel 7. In place of this arrangement, the traveling device 2 may comprise a crawler traveling device having a crawler belt wound around a plurality of wheels.

(5) In the foregoing embodiment, the traveling functional portions 12 are provided one pair on the left and right on the front and rear opposed sides of the vehicle body 1. Instead, the traveling devices 2 may be provided three sets, or further alternatively the traveling devices 2 may be provided five or more sets.

(6) In the foregoing embodiment, in the respective one of the four sets of bending link mechanisms 10, the intermediate bending portion 11 is bent toward the vehicle body front/rear intermediate side. Instead, not only in one or some of the four bending link mechanisms 10, but in all of the four sets of bending link mechanisms 10, the intermediate bending portion 11 may be bent toward the vehicle body front/rear outer side.

(7) In the foregoing embodiment, as the supporting mechanism, there is provided the bending link mechanism 10 including the traveling device 2 and the idle wheel 3 respectively. In place of this arrangement, as such supporting mechanism, there can be separately provided an elevating/lowering operational mechanism which supports the traveling device 2 with allowing its elevation and lowering and a further elevating/lowering operational mechanism which supports the idle wheel 3 with allowing its elevation and lowering.

(8) In the foregoing embodiment, the turning mechanism 16 is provided with the turning operation hydraulic cylinder 18 capable of turning the bending link mechanism 10 entirely. Instead, this turning operation may be effected by an electric motor or a hydraulic motor.

(9) In the foregoing embodiment, as an example of the work vehicle, an electronically controlled robot was cited. However, the present invention is not limited to the arrangements shown in the drawings.

DESCRIPTION OF REFERENCE NUMERALS/MARKS

1: vehicle body
2: traveling device
3: idle wheel
5: driving mechanism
10: bending link mechanism (supporting mechanism)
12: traveling functional portion
16: turning mechanism
25: first link
26: second link
29: first hydraulic cylinder
30: second hydraulic cylinder
31: first coupling member
32: second coupling member
34: third coupling member
36: fourth coupling member

What is claimed is:

1. A work vehicle comprising:
a vehicle body;
a plurality of traveling devices for driving traveling;
a plurality of bending link mechanisms supporting the plurality of traveling devices to the vehicle body, with allowing the plurality of traveling devices to be elevated/lowered independently of each other;
a driving mechanism capable of changing respective postures of the plurality of bending link mechanisms independently of each other; and
an idle wheel freely rotatably supported by an intermediate bending portion of each one of the plurality of bending mechanisms.

2. The work vehicle of claim 1, wherein the driving mechanism is capable of changing the posture of the bending link mechanism, with maintaining a state of the intermediate bending portion of the bending link mechanism being bent toward a vehicle body front/rear intermediate side.

3. The work vehicle of claim 1, wherein the driving mechanism is capable of changing the posture of the bending link mechanism to an extended posture in which the traveling device and the idle wheel respectively is located on more of a vehicle body front/rear outer side than a vehicle body front/rear direction outer end.

4. The work vehicle of claim 1, wherein at each of the left and right sides on the front of the vehicle body and at each of the left and right sides on the rear of the vehicle body a set of the bending link mechanism, the traveling device and the idle wheel is provided.

5. The work vehicle of claim 1, wherein the idle wheel is nonmotorized.

6. The work vehicle of claim 1, wherein:
the bending link mechanism includes a first link having one end portion thereof supported to the vehicle body to be pivotable about a horizontal axis, and a second link having one end portion thereof pivotally connected to the other end portion of the first link to be pivotable about the horizontal axis and having the other end portion thereof supported to the traveling device; and
the idle wheel is supported to a pivot connecting portion between the first link and the second link.

7. The work vehicle of claim 6, wherein the driving mechanism includes a first hydraulic cylinder capable of changing a pivotal posture of the first link relative to the vehicle body, and a second hydraulic cylinder capable of changing a pivotal posture of the second link relative to the first link.

8. A work vehicle comprising:
a vehicle body;
a plurality of traveling devices for driving traveling;
a plurality of idle wheels provided in correspondence with the respective plurality of traveling devices;
a supporting mechanism configured to support the plurality of traveling devices to the vehicle body, with allowing change in positions of the traveling devices independently of each other, the supporting mechanism being configured to support the plurality of idle wheels to the vehicle body, with allowing change in positions of the idle wheels independently of each other; and
a driving mechanism capable of variably operating the supporting mechanism;
wherein the traveling device and the idle wheel corresponding to the traveling device together constitute a traveling functional portion; and
wherein the supporting mechanism is switchable, in each one of the plurality of traveling functional portions, between a traveling state in which the traveling device is placed on a ground surface and a free moving state in which the idle wheel is placed on the ground surface and the traveling device corresponding thereto is set above the ground surface.

9. The work vehicle of claim 8, wherein the plurality of idle wheels are nonmotorized.

10. The work vehicle of claim 8, wherein the driving mechanism is switchable between an all traveling state in which all of the plurality of traveling functional portions are set to the traveling state and a partial traveling state in which at least one of the plurality of the traveling functional portions is set to the free moving state.

11. The work vehicle of claim 10, wherein:
a pair of right and left traveling functional portions is provided on a front side of the vehicle body, and another pair of right and left traveling functional portions is provided on a rear side of the vehicle body; and
when the driving mechanism is in the partial traveling state, either one of the pair located on the vehicle body front side and pair located on the vehicle body rear side is set to the traveling state, and the other is set to the free moving state.

12. The work vehicle of claim 8, wherein:
the supporting mechanism includes a plurality of bending link mechanisms configured to support the plurality of traveling devices by the vehicle body, with allowing elevation and lowering of the plurality of traveling devices independently of each other; and
the bending link mechanism includes a first link having one end portion thereof supported by the vehicle body to be pivotable about a horizontal axis, and a second link having one end portion thereof pivotally connected to the other end portion of the first link to be pivotable about a horizontal axis, the second link having the other end portion thereof supported by the traveling device; and
the idle wheel is supported to a pivot connecting portion between the first link and the second link.

13. The work vehicle of claim 12, wherein the driving mechanism includes a first hydraulic cylinder capable of changing a pivotal posture of the first link relative to the vehicle body, and a second hydraulic cylinder capable of changing a pivotal posture of the second link relative to the first link.

14. A work vehicle comprising:
a vehicle body;
a plurality of traveling devices for driving traveling;
a plurality of bending link mechanisms supporting the plurality of traveling devices to the vehicle body, with allowing the plurality of traveling devices to be elevated/lowered independently of each other; and
a driving mechanism capable of changing respective postures of the plurality of bending link mechanisms independently of each other;
wherein the bending link mechanism includes a first link having one end portion thereof supported to the vehicle body to be pivotable about a horizontal axis, and a second link having one end portion thereof pivotally connected to the other end portion of the first link to be pivotable about a horizontal axis, the second link having the other end portion thereof supported to the traveling device;
wherein the driving mechanism includes a first hydraulic cylinder capable of changing a pivotal posture of the first link relative to the vehicle body, and a second hydraulic cylinder capable of changing a pivotal posture of the second link relative to the first link;
wherein the first hydraulic cylinder and the second hydraulic cylinder are respectively disposed proximate the first link; and
wherein one end side of the first hydraulic cylinder is pivotally connected to a supporting member on the vehicle body side via a first coupling member and pivotally connected to one end side of the first link via a second coupling member, the other end side of the first hydraulic cylinder is pivotally connected to the other end side of the first link, and
one end side of the second hydraulic cylinder is pivotally connected to one end side of the first link and the other end side of the second hydraulic cylinder is pivotally connected to one end side of the second link via a third coupling member and pivotally connected to the other end side of the first link via a fourth coupling member.

15. The work vehicle of claim 14, further comprising:
a plurality of turning mechanisms configured to support the plurality of respective bending link mechanisms to the vehicle body, each of the turning mechanisms is capable of changing orientation thereof about a vertical axis in unison with the driving mechanism and the traveling device associated therewith.

16. The work vehicle of claim 15, wherein the turning mechanism is detachably attached to the vehicle body in unison with the driving mechanism and the traveling device.

* * * * *